Feb. 21, 1933.  F. ECKERT  1,898,039
PROCESS FOR PRODUCING HOMOGENEOUS GLASS IN TANKS
Filed March 1, 1928
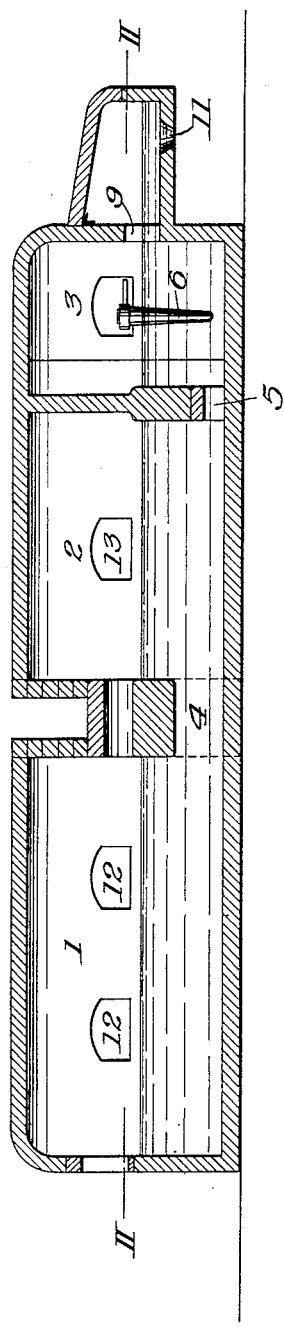
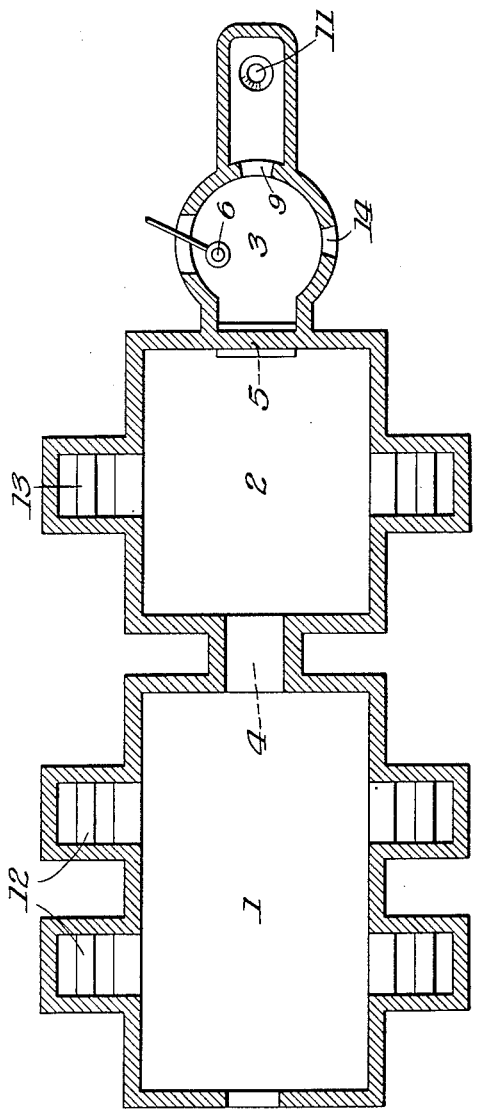
INVENTOR
Fritz Eckert

UNITED STATES PATENT OFFICE

FRITZ ECKERT, OF BERLIN, GERMANY, ASSIGNOR OF ONE-FOURTH TO WILLIAM A. MORTON AND ONE-FOURTH TO PAUL L. GEER, BOTH OF PITTSBURGH, PENNSYLVANIA

PROCESS FOR PRODUCING HOMOGENEOUS GLASS IN TANKS

Application filed March 1, 1928, Serial No. 258,268, and in Germany March 4, 1927.

The invention has to do with the production of homogeneous glass in tanks for commercial glass in large quantities, in contrast to optical glasses melted in a pot, in the case of which, for a long time, attention has been directed to homogeneity and homogenizing.

The successful method used here, the mechanical stirring, cannot be transferred directly to the homogenizing of glass melted in the tank. One object of the present invention is to provide a new method and means by which the mechanical stirring process may bring the desired result in the tanks.

It has been found that in all the fully automatic processes in which forming is accomplished without pressure, the question of the production of uniform product is identical with the question of the production of homogeneous glass, i. e., glass chemically and thermally uniform, at the point of working.

Attempts have been made to do away with the usual lack of homogeneity in essentially two different ways in connection with various drawing processes—the chief of which are for table glass, Fourccult and Libbey-Owens, for tubular glass, Danner—and also in connection with the continuous glass feeding of hollow glass machines. These methods have involved (1) subsequent tempering in setting chambers, at times very large, mostly by reheating; and (2) holding back the mechanically and thermally inhomogeneous glass by cut-off means.

Neither of these measures, however, attacks the trouble at its source, since they do not seek to prevent it at its inception nor are they able to combat it with adequate means. On the other hand, they also have very serious disadvantages. Re-heating especially favors the devitrification of the glass, since the maximum of power of crystallization lies at the temperature below the maximum of growth speed. Thus, a glass which has been cooled to this second critical zone where strong core formation prevails, readily shows visible devitrification phenomena when it is again heated.

Besides, the attempt to homogenize thermally by heating must be characterized physically as extremely inadequate. Practically, the addition of heat is possible only from one side, i. e., from the top of the tank. Due to specific gravity and in part to the method of construction of the tank, the hotter parts float on top. By re-heating, therefore, these warmer parts are especially affected and the thermal homogeneity is not increased. The method of setting the glass, to be sure, brings about an especially thermal equalization between the various parts of the glass, if care is taken that the heat is not taken away nor added ununiformly in spots. The effectiveness of this means in the pot is offset in the tank under continuous operation by the flow of the glass with steady output. This method cannot bring about chemical homogeneity at all.

The attempt, by filtering of any kind, to hold back chemically and physically inhomogeneous glass from passing into the working opening or the passage into another part of the tank is just as unsatisfactory. As means of this kind have been tried, and have been partially successful, so that in the course of experimentation over many years it was found possible to work generally with machines, we must consider: passage through throat tanks, float cut-offs, and cut-offs of every kind in front of the exit passages. By gathering from a certain depth, it was attempted to hold back at least a part of the frequently specified lighter impurities. If the collection of these impurities in the course of time becomes too great, a general cleansing is undertaken, e. g., by skimming, melting and washing. The last two methods are attended by serious interruptions in continuous operation.

In isolated cases, the additional well known method of blowing with steam, etc. is used, in which the glass, made liquid by heating, is mixed mechanically in a crude way with steam bubbles. All the glass in the tank is thus violently tumbled about and, finally, again permeated by bubbles, and must again be melted at a high temperature and refined. This, likewise, causes a serious interruption in continuous operation.

Finally, it is attempted to stabilize the unstable conditions of the by-flow of the active glass masses past the dead, inactive masses, by as small a disturbance of the causes of equilibrium as possible, by as uniform charging and gathering as possible.

The process embodying my invention and described herein starts from the fundamental knowledge that tank glass must be subjected to a thorough mechanical homogenizing by stirring, if it is to attain the thermal and chemical degree of uniformity desired, and it combines with this well known method of mechanical stirring a new form of tank which makes it possible to homogenize the glass in its entire mass and to maintain it in this condition up to the time of use.

In the accompanying drawing, which illustrates a form of apparatus for practicing my invention, Fig. 1 is a longitudinal, vertical sectional view; and Fig. 2, a horizontal sectional view, taken on line II—II of Fig. 1.

Referring to the drawing, the furnace shown is of the open hearth type, and comprises a melting chamber 1, a refining chamber 2, and a relatively small stirring or homogenizing chamber 3, the melting chamber being in communication with the refining chamber through a port 4 and the homogenizing chamber being in communication with chamber 2 by a submerged port 5. 6 designates a stirrer device of any suitable construction, designed to be operated in chamber 3. The homogenization chamber employed should preferably be small, of a volume, for example, no larger than one-fifth of the daily output of the furnace or tank in continuous operation.

Glass from the chamber 3 is passed through a port 9 to a fore-hearth or feeder box, said member being provided with a discharge orifice 11. 12, 13 and 14 respectively designate burner openings for the several chambers 1, 2 and 3, into which burners may be placed and operated in the well known manner.

To reach the first goal, the stirring process is undertaken in a separate small chamber which is so formed that the whole mass of glass must pass through it in a certain direction. No part of the stream of glass or the mass of glass remains, therefore, untouched and every portion is subjected to this process at the same time, i. e., at the same "age".

The second effect, namely, that of conserving the homogeneity of the glass, is obtained as follows. The aforementioned homogenizing chamber is placed at the proper point, namely, where the glass in the course of its development shows just the right degree of thinness with a generally falling temperature (if possible without reheating), which, in a practical time, still affords sufficient diffusion of the smallest particles for homogenizing.

The homogenizing chamber must, therefore, be placed as close as possible to the outlet of the machine, so that, after homogenizing has been accomplished, the treated glass may be carried over as quickly as possible in the viscous condition for working, which prevents last minute de-homogenization by convection currents, chemical changes, etc. As illustrated by the drawing, the glass is passed to and through the fore-hearth or feeder-box in a relatively thin stream.

The tank construction with this mechanical stirring device is characterized, therefore, by the absence of the previously generally used setting tank, also termed working tank, or refining tank. The homogenizing chamber can also be added separately, or there can be used for each tank a single such chamber, from the exit opening of which, the distribution to the several working machines takes place. The mechanical stirring itself can be done either by one or several stirring units. In any event, the stirring tracks must be able to cover the homogenizing chamber in its entire extent. In this connection, care must be taken that the stirrer itself by its glass displacement, according to its volume, exerts a certain action even outside of its actual path in the adjacent surrounding space, an effect which can be termed kneading. This action is itself greater, the greater the volume ratio of the stirrer is to the homogenizing chamber. It is, therefore, advantageous to keep the stirring chamber as small as possible, just large enough so that the glass is stirred sufficiently long at the predetermined temperature and the existing mass of the mixture.

If the mean stirring temperature is taken as about midway between the temperatures of refining and working, then a stirring time of from one to two hours can be regarded as fully sufficient.

At its entrance and exit openings, the homogenizing chamber should be so built that the entering warmer glass comes in as high up as possible, and as colder glass is drawn off, this should be done as far down as possible. By this means, the fresh entering warmer glass does not form a convection current and cannot pass the stirrer upward insufficiently homogenized.

It is possible, however, to carry out the process in reverse, if by sufficient insulation of the homogenizing chamber care is taken that the glass in passing through suffers no loss of heat sufficient to cause convection currents.

The process here described for melting homogeneous tank glass which is characterized by the fact that the refined glass is passed in a stream caused by the outflow through a relatively narrow chamber controlled by mechanical stirrers, preferably in an upward direction, and then as quickly as possible is cooled to working temperature, can be strengthened further by suitable means, especially as regards the tank design.

As such means for lessening the horizontal and vertical vagrant currents, a lessening of the glass depth within the furnace to a minimum is proposed. Further, the danger of these vagrant currents which mix unseasoned glass with that already seasoned is said to be obviated by one or more subdivisions of the tank, e. g., into melting and refining sections. This sectioning can be advantageously carried out with the method of firing.

Furthermore, layers adhering to walls and floor, consisting of old glass, are to be avoided as far as possible by suitable insulation.

Aside from the fact that the homogenized glass, according to the process described, is practically not at all exposed to the dangers of de-vitrification, which in the case of commercial glasses appears exclusively at points of inhomogeneity, the technical firing devices should be carried out as far as possible, so that the glass from melting to working goes through an exclusively descending temperature scale.

Besides the generally used methods mentioned at the outset, there are some special ones which have become known and which have to do partly with the stirring in the tank and partly with homogenizing, but which, nevertheless, in essentials, differ from the process here proposed.

For example, it has been recommended that the melting mass in the melting tank be stirred, in order to hasten this process. Practically, the liquation and, therefore, inhomogeneity are only aided by this. Likewise, stirring in the refining section of the tank has no purpose in the case of the dimensions formerly used. Either the stirring motion must be too great for good mechanical effect or too small for satisfactory control of all the parts of the glass concerned. Especially, a stirrer passing back and forth diagonally through the tank must be characterized as highly unsatisfactory. In any event, however, these proposals do not see that, for effective execution of the stirring a proper dimensioning and arrangement of the homogenizing chamber is of fundamental importance.

Likewise, in the case of glass feeders, the attempt has been made to find means which would improve the conditions of viscosity at the work outlet, so that the thermal inequalities of heating and cooling would be equalized by causing a slow rotation of a small mass of glass immediately before working, but at the working temperature (high viscosity). Even if a thermal homogeneity could be attained in this way, it is out of the question to attain by such means the far more important chemical homogeneity.

I claim:

1. The process of making homogeneous glass in tanks which comprises melting the glass in a continuously operating furnace, flowing the molten glass from a melting pool thereof to a refining pool thereof through a submerged port, then after completely refining in flowing the glass into a relatively small homogenizing body, in mechanically agitating said body so that every portion of the glass therein is agitated at the same time, in causing the glass of said body during agitation thereof to flow upwardly from the refining pool, and then quickly cooling the glass by passing it from the top of the said body in a thin stream for direct discharge to forming apparatus.

2. In apparatus for making homogeneous glass, a furnace having a melting chamber, a refining chamber, the furnace having a submerged port connecting the melting and refining chambers, a relatively small homogenizing chamber in direct communication with the refining chamber through a submerged port, a stirrer mechanism in the homogenizing chamber, said homogenizing chamber and stirrer mechanism being proportioned so that all of the glass in said homogenizing chamber will be stirred at the same time, a fore-hearth, said homogenizing chamber having a port in its wall in direct communication with the fore-hearth, the arrangement of the second mentioned port and fore-hearth causing the glass to flow upwardly in a narrow stream in the homogenizing chamber for maximum coaction with the stirrer mechanism to insure the production of chemically homogenous glass.

3. The method for the making of homogeneous glass consisting in refining the glass, thereafter vertically and laterally flowing and mechanically stirring the glass in a relatively small mass at a temperature higher than the working temperature of the glass into a homogeneous condition at a location between the zone of refining and the zone of working, and in rapidly discharging the glass from said mass directly to a working zone and at the same time rapidly reducing the temperature of the glass from the said higher temperature to the working temperature.

4. The method for the making of homogeneous glass in a continuous melting furnace consisting in refining the glass in a refining chamber of the furnace, in thereafter vertically and laterally flowing and mechanically stirring the glass into a homogeneous condition at a temperature higher than the working temperature of the glass in a separate chamber of said furnace relatively small with respect to said refining chamber and located between the zone of refining and the zone of working, and in rapidly discharging the glass from said separate chamber to a working zone and at the same time rapidly reducing the temperature of the glass from the said higher temperature to the working temperature.

5. The method for the making of homogeneous glass in a continuous melting furnace consisting in refining the glass, in thereafter flowing the glass through a submerged port into a relatively small annular chamber and thence upwardly and forwardly in said chamber at a temperature higher than the working temperature with agitation to acquire an homogeneous condition, and in rapidly discharging the glass from an outlet forming a stream adjacent the upper surface of the glass in the annular chamber and at the same time rapidly reducing the temperature of the glass to working temperature.

6. In apparatus for making homogeneous glass, a furnace having a refining chamber, a relatively small homogenizing chamber in direct communication with the refining chamber through a submerged port, a stirrer mechanism in the homogenizing chamber, said homogenizing chamber and stirrer mechanism being proportioned so that all of the glass in said homogenizing chamber will be stirred at the same time, a fore-hearth, said homogenizing chamber having a port in its wall in direct communication with the fore-hearth, the arrangement of the second mentioned port and fore-hearth causing the glass to flow upwardly in a narrow stream in the homogenizing chamber for maximum coaction with the stirrer mechanism to insure the production of chemically homogeneous glass.

7. The method for the making of homogeneous glass consisting in refining the glass, in thereafter flowing the glass vertically through a relatively small chamber while mechanically stirring the glass in said chamber and at a temperature higher than the working temperature of the glass into a homogeneous condition at a location between the zone of refining and the zone of working, and in discharging the conditioned glass from said chamber to a working zone while reducing the temperature of the conditioned glass from the said higher temperature to the working temperature.

In testimony whereof I affix my signature.

FRITZ ECKERT.